(12) United States Patent
Balci et al.

(10) Patent No.: US 9,773,340 B2
(45) Date of Patent: Sep. 26, 2017

(54) RENDERING USING RAY TRACING TO GENERATE A VISIBILITY STREAM

(71) Applicant: QUALCOMM Incorporated, San Diego, CA (US)

(72) Inventors: Murat Balci, Orlando, FL (US); Christopher Paul Frascati, Oviedo, FL (US); Juraj Obert, Orlando, FL (US); Hitendra Mohan Gangani, Orlando, FL (US); Avinash Seetharamaiah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 14/738,535

(22) Filed: Jun. 12, 2015

(65) Prior Publication Data

US 2016/0364901 A1 Dec. 15, 2016

(51) Int. Cl.
| | | |
|---|---|---|
| *G06T 15/06* | (2011.01) | |
| *G06T 15/40* | (2011.01) | |
| *G06T 1/20* | (2006.01) | |
| *G06T 1/60* | (2006.01) | |
| *G06T 15/00* | (2011.01) | |

(52) U.S. Cl.
CPC ............ *G06T 15/06* (2013.01); *G06T 1/20* (2013.01); *G06T 1/60* (2013.01); *G06T 15/005* (2013.01); *G06T 15/40* (2013.01)

(58) Field of Classification Search
CPC .. G06T 15/06; G06T 1/20; G06T 1/60; G06T 15/40
See application file for complete search history.

(56) References Cited

U.S. PATENT DOCUMENTS

| | | | |
|---|---|---|---|
| 6,636,212 B1 | 10/2003 | Zhu | |
| 8,817,074 B2 | 8/2014 | Russell | |
| 9,607,426 B1* | 3/2017 | Peterson | ............... G06T 15/06 |
| 2010/0079457 A1* | 4/2010 | Tavenrath | ............... G06T 15/06 |
| | | | 345/426 |
| 2013/0069943 A1 | 3/2013 | Kallio et al. | |
| 2013/0120380 A1 | 5/2013 | Kallio et al. | |
| 2013/0135322 A1* | 5/2013 | Seetharamaiah | ..... G06T 15/005 |
| | | | 345/501 |
| 2013/0241938 A1 | 9/2013 | Gruber et al. | |
| 2014/0063016 A1* | 3/2014 | Howson | ................... G06T 15/80 |
| | | | 345/426 |

(Continued)

OTHER PUBLICATIONS

Vinkler, Visibility driven BVH build up algorithm for ray tracing, Computers & Graphics 36, 2012, pp. 283-296.*

(Continued)

*Primary Examiner* — Mark Zimmerman
*Assistant Examiner* — Phuc Doan (57) ABSTRACT

A method and apparatus for ray tracing may include a method, manufacture and apparatus for ray tracing that may include dividing a render target into a plurality of bins. Next, a visibility pass is performed using ray tracing to generate a visibility stream such that the visibility stream indicates, for each bin of the plurality of bins, which primitives are visible in the bin. Then, for at least one bin of the plurality of bins, each primitive in the bin that is indicated in the visibility stream as being visible in the bin is rendered.

23 Claims, 5 Drawing Sheets

(56) References Cited

U.S. PATENT DOCUMENTS

2016/0027203 A1\* 1/2016 Lee .................. G06T 15/005
  345/423
2016/0116973 A1\* 4/2016 Lee .................. G06F 1/3287
  345/419

OTHER PUBLICATIONS

Voica, Practical techniques for ray tracing in games, URL:http://www.gamasutra.com/blogs/AlexandruVoica/20140318/213148/Practical_techniques_for_ray_tracing_in_games.php?print=1, Mar. 18, 2014, pp. 1-12.\*

International Search Report and Written Opinion from International Application No. PCT/US2016/027132, dated Jun. 24, 2016, 15 pp.

Wald et al., "State of the Art in Ray Tracing Animated Scenes," Eurographics Technical Report Series, Sep. 2007, pp. 89-116, XP007908773.

Response to Written Opinion dated Jun. 24, 2016 in International Application No. PCT/US2016/027132 filed Apr. 5, 2017, 4 pp.

Second Written Opinion issued in International Application No. PCT/US2016/027132 dated May 23, 2017, 8 pp.

\* cited by examiner

RENDERING USING RAY TRACING TO GENERATE A VISIBILITY STREAM

TECHNICAL FIELD

This disclosure relates to graphics processing, and more particularly to techniques for tile-based rendering.

BACKGROUND

A graphics processing unit (GPU) may generate visual content for display, such as content for graphical user interfaces and video games. A GPU may convert two-dimensional or three-dimensional (3D) objects into a two-dimensional (2D) pixel representation that may be displayed. Converting information about 3D objects into a bit map that can be displayed is known as pixel rendering, and may require considerable memory and processing power. In the past, 3D graphics capability was available only on powerful workstations. However, now 3D graphics accelerators are commonly found in personal computers (PC), as well as in in embedded devices, such as smart phones, tablet computers, portable media players, portable video gaming consoles, and the like.

SUMMARY

Techniques of this disclosure generally relate to a method, manufacture and apparatus for ray tracing that may include dividing a render target into a plurality of bins. Next, a visibility pass is performed using ray tracing to generate a visibility stream such that the visibility stream indicates, for each bin of the plurality of bins, which primitives are visible in the bin. Then, for at least one bin of the plurality of bins, each primitive in the bin that is indicated in the visibility stream as being visible in the bin is rendered.

According to one example of the disclosure, a method for graphics processing comprises dividing a render target into a plurality of bins; performing a visibility pass using ray tracing to generate a visibility stream such that the visibility stream indicates, for each bin of the plurality of bins, which primitives are visible in the bin; and for at least one bin of the plurality of bins, rendering each primitive in the bin that is indicated in the visibility stream as being visible in the bin.

According to another example of the disclosure, a device for graphics processing comprises: a memory; and at least one processing unit that is configured to perform actions, including: dividing a render target into a plurality of bins; performing a visibility pass using ray tracing to generate a visibility stream such that the visibility stream indicates, for each bin of the plurality of bins, which primitives are visible in the bin; and for at least one bin of the plurality of bins, rendering each primitive in the bin that is indicated in the visibility stream as being visible in the bin.

According to another example of the disclosure, a tangible computer-readable storage medium storing instructions for graphics processing that, when executed, cause one or more processors to: divide a render target into a plurality of bins; perform a visibility pass using ray tracing to generate a visibility stream such that the visibility stream indicates, for each bin of the plurality of bins, which primitives are visible in the bin; and for at least one bin of the plurality of bins, render each primitive in the bin that is indicated in the visibility stream as being visible in the bin.

According to another example of the disclosure, a device for graphics processing comprises means for rendering a render target that includes a plurality of primitives, wherein the means for rendering the render target includes: means for dividing a render target into a plurality of bins; means for performing a visibility pass using ray tracing to generate a visibility stream such that the visibility stream indicates, for each bin of the plurality of bins, which primitives are visible in the bin; and means for rendering, for at least one bin of the plurality of bins, each primitive in the bin that is indicated in the visibility stream as being visible in the bin.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Briefly stated, aspects of this disclosure generally relate a method, manufacture and apparatus for ray tracing that may include dividing a render target into a plurality of bins. Next, a visibility pass is performed using ray tracing to generate a visibility stream such that the visibility stream indicates, for each bin of the plurality of bins, which primitives are visible in the bin. Then, for at least one bin of the plurality of bins, each primitive in the bin that is indicated in the visibility stream as being visible in the bin is rendered.

Figure 1:
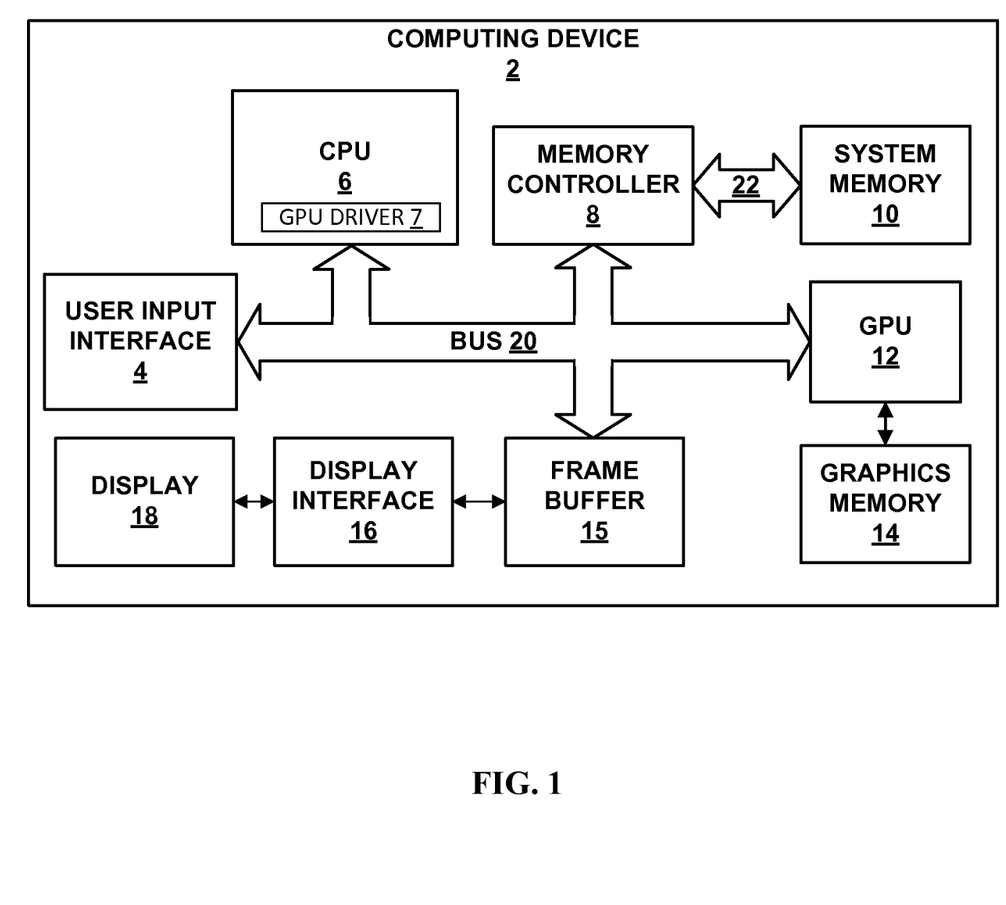
FIG. 1 is a block diagram showing an example computing device configured to use the techniques of this disclosure.

FIG. 1 is a block diagram showing an example computing device configured to use the techniques of this disclosure. As illustrated in the example of FIG. 1, computing device 2 may include a user input interface 4, a central processing unit (CPU) 6, a memory controller 8, a system memory 10, a graphics processing unit (GPU) 12, a graphics memory 14, a display interface 16, a display 18 and buses 20 and 22. Note that in some examples, graphics memory 14 may be "on-chip" with GPU 12. In some cases, all hardware elements shown in FIG. 1 may be on-chip, for example, in a system on a chip (SoC) design. User input interface 4, CPU 6, memory controller 8, GPU 12 and display interface 16 may communicate with each other using bus 20. Memory controller 8 and system memory 10 may also communicate with each other using bus 22.

Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute a GPU driver 7 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory system 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Frame buffer 15 may be an independent memory or may be allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computer device 2 via a wired or wireless communications link. For instance, display 18 may be a computer monitor or flat panel display connected to a personal computer via a cable or wireless link.

Figure 2:
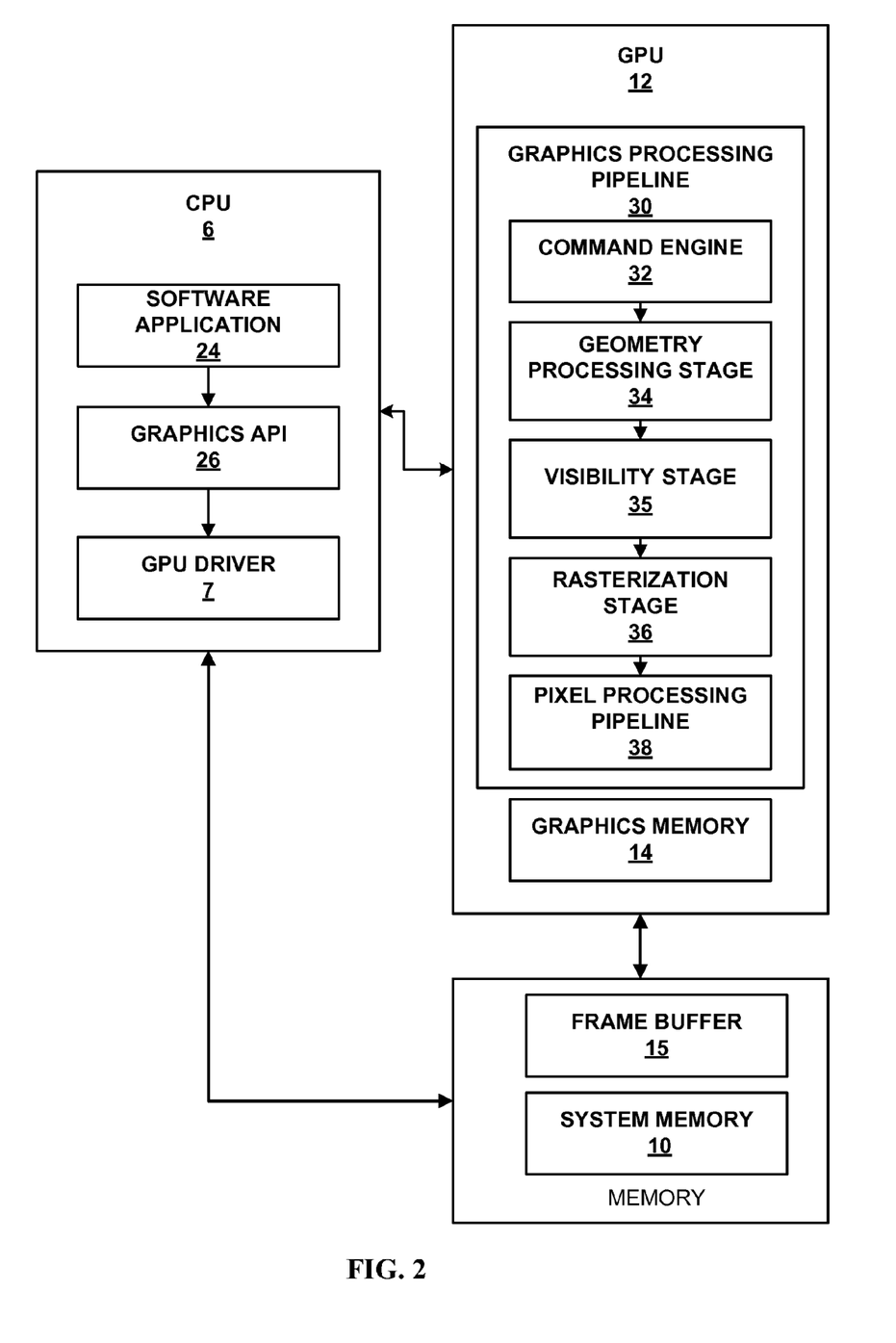
FIG. 2 is a block diagram showing an example processing units configured to use the techniques of this disclosure.

FIG. 2 is a block diagram illustrating example implementations of CPU 6, GPU 12, and system memory 10 of FIG. 1 in further detail. CPU 6 may include at least one software application 24, a graphics API 26, and a GPU driver 7, each of which may be one or more software applications or services that execute on CPU 6. GPU 12 may include a graphics processing pipeline 30 that includes a plurality of graphics processing stages that operate together to execute graphics processing commands. GPU 12 may be configured to execute graphics processing pipeline 30 to render image data. As shown in FIG. 2, graphics processing pipeline 30 may include a command engine 32, a geometry processing stage 34, a visibility stage 35, a rasterization stage 36, and a pixel processing pipeline 38. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that uses 2D or 3D graphics.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 40 associated with a display device.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations. In accordance with some example embodiments of this disclosure, a pixel shader program may also include instructions that selectively cause texture values to be retrieved for source pixels based on corresponding destination alpha values for the source pixels.

Graphics processing pipeline 30 may be configured to receive one or more graphics processing commands from CPU 6, via graphics driver 7, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Visibility stage 35 is configured to use ray tracing to generate a visibility stream, as discussed in greater detail below. In some examples, as discussed in greater detail below, visibility stage 35 also generates visibility statistics and/or visibility heuristics.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership text, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Although frame buffer 15 and system memory 10 are illustrated as being separate memory units, in other examples, frame buffer 15 may be part of system memory 10.

As discussed above, graphics processing pipeline 30 may render a graphics image. In some examples, graphics processing pipeline 30 may receive a batch of primitives (i.e., one or more primitives) to render into a resulting graphics image. To render the batch of primitives, in some examples, the resulting graphics image may be subdivided into a plurality of smaller portions (e.g., tiles of pixels or bins), and graphics processing pipeline 30 may render each portion of the graphics image as a separate rendering pass.

In some examples, GPU 12 may perform a binning pass, followed by one or more rendering passes. During the binning pass, for a particular bin, GPU 12 may use ray tracing to generate a visibility stream which indicates which primitives are actually visible in the bin. In some examples, during the binning pass, GPU 12 generates visibility statistics and heuristics simultaneously with the generation of the visibility stream, as discussed in greater detail below. The binning pass performed by GPU 12 may be interchangeably referred to as a visibility pass.

In some examples, as discussed above, a frame may be divided into a plurality of bins. In some examples, the graphics hardware contains graphics memory 14, and graphics memory 14 is configured as fast memory that is of a size sufficient to hold at least one bin of data. As part of a single rendering pass for a particular portion of the frame, graphics processing pipeline 30 may render all or a subset of the batch of primitives with respect to a particular subset of the destination pixels (e.g., a particular bin of destination pixels) of the frame. After performing a first rendering pass with respect to a first bin, graphics processing pipeline 30 may perform a second rendering pass with respect to a second bin, and etc. Graphics processing pipeline 30 may incrementally traverse through the bins until the primitives associated with every bin have been rendered.

During a rendering pass, in some examples, GPU 12 splits a scene into bins and renders all triangles in the bin that are indicated by the visibility stream as actually visible in the final rendered scene. For example, some triangles may be behind one or more other triangles and will not be visible in the final rendered scene. In this way, triangles that are not visible need not be rendered for that bin.

While performing a particular rendering pass, the pixel data for the bin associated with that particular rendering pass may be stored in a graphics memory 14 (sometimes called a bin buffer). After performing the rendering pass, graphics processing pipeline 30 may transfer the contents of graphics memory 14 to frame buffer 15. In some cases, graphics processing pipeline 30 may overwrite a portion of the data in frame buffer 15 with the data stored in graphics memory 14. In other cases, graphics processing pipeline 30 may composite or combine the data in frame buffer 15 with the data stored in graphics memory 14. After transferring the contents of graphics memory 14 to frame buffer 15, graphics processing pipeline 30 may initialize graphics memory 14 to default values and begin a subsequent rendering pass with respect to a different bin.

While GPU 12 may render to graphics memory 14 as discussed above, in some examples, GPU 12 may instead render to graphics memory 14 or perform direct rendering based on a separate determination that is made for each bin. In some examples, a decision may be made on a bin-by-basis as to whether to render to graphics memory 14 (which requires a subsequent load/store operation) or to instead perform direct rendering, which uses slower system memory 10 rather that fast local graphics memory 14.

In some examples, GPU 12 and/or CPU 6 of FIG. 1 and/or FIG. 2 may be employed as examples of at least one processing unit. In some examples, graphics memory 14, frame buffer 15, and/or system memory 10 of FIG. 1 and/or FIG. 2 may be employed as examples of a memory.

Figure 3:
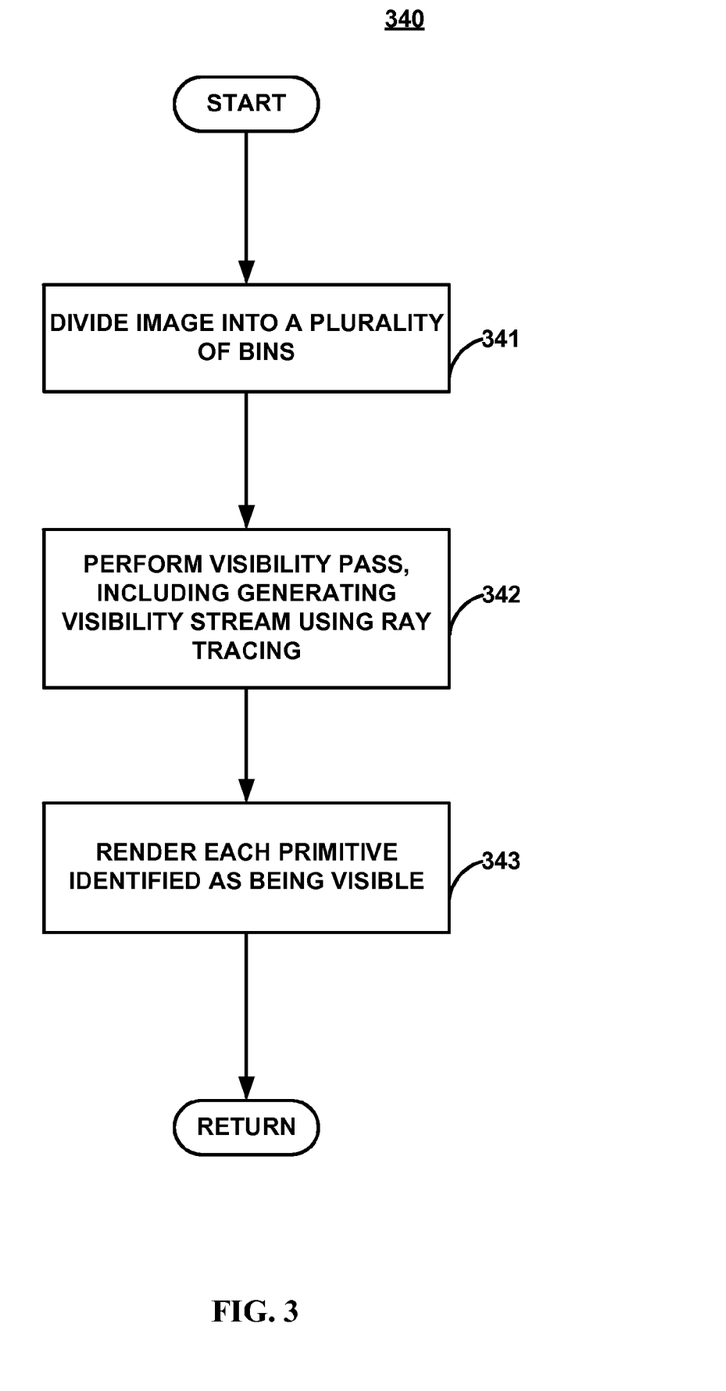
FIG. 3 is a flow chart showing an example of a method for graphics processing.

FIG. 3 is a flow chart showing an example of a method (440) for graphics processing. After a start block, a GPU (e.g., GPU 12 of FIG. 2) divides a render target into a plurality of bins (441). The render target includes a plurality of primitives. Then, a visibility stage (e.g. visibility stage 35 of FIG. 2) performs a visibility pass using ray tracing to generate a visibility stream such that the visibility stream indicates, for each bin of the plurality of bins, which primitives are visible in the bin (442). Next, after performing the visibility pass, for at least one bin of the plurality of bins, GPU 12 renders each primitive in the bin that is indicated in the visibility stream as being visible in the bin (443). The process then advances to a return block, where other processing is resumed.

Render targets may be anything that is rendered by the GPU, including, for example, images such as graphics images (e.g., GUIs and two-dimensional (2D) and/or three-dimensional (3D) graphics scenes), portions of such images, and/or image data for such images and/or portions of such images.

The visibility stream indicates, for each bin of the plurality of bins, which primitives are visible in the bin. In the background art, generating a visibility stream is accomplished using a vertex-shader-only pass that generates the information of which triangles (and associated) hit the bin regardless of the actual visibility of the triangles on the final render target. In contrast, in the present disclosure, at block 442 of FIG. 3, the visibility stream indicates, for each bin of the plurality of bins, which primitives are actually visible in the bin, as opposed to indicating which primitives merely hit the bin regardless of actual visibility. Throughout this document, referring to a primitive as "visible" refers to actual visibility of the primitive, and a primitive is not visible, as the term "visible" is defined in this document, if the primitive hits a bin but is not actually visible.

Returning to FIG. 2, in some examples, as discussed above, when GPU 12 renders a render target, prior to the rendering passes, GPU 12 uses a binning pass (which may also be referred to as a visibility pass) to generate a visibility stream. The visibility stream includes an indication, for each bin, as to which triangles are actually visible in the bin. In some examples, during the visibility pass, graphics processing pipeline 30 simultaneously generates a visibility stream and generates visibility heuristics. That is, in some examples, graphics pipeline 30 generates a visibility stream and visibility heuristics at the same time or within substantially the same time frame.

During the visibility pass, in some examples, visibility stage 35 casts a ray for each pixel. In some examples, visibility stage 35 casts, for each pixel, a primary ray from the virtual camera through the pixel. Visibility stage 35 generates visibility information via ray tracing, including performing ray-bounding box intersection tests such as ray-to-bounding-box and ray-to-triangle intersections tests to generate the visibility stream. Based on the ray intersection tests, GPU 12 generates a visibility stream such that the visibility stream indicates for each bin, which primitives are visible in the bin. The visibility stream indicates which primitives are actually visible in the bin, rather than indicating which primitives hit the bin. In some examples, each primitive is a triangle. Examples of the ray tracing performed during the visibility pass are discussed in greater detail below.

Following the visibility pass, GPU 12 performs one or more rendering passes per bin. In some examples, for each bin, each triangle identified by the visibility stream as visible in the bin is rendered into the graphics memory 14, where graphics memory 14 is configured to operate as a fast local memory in some examples. For each bin, rendering may be skipped for any triangle that is indicated by the visibility stream as not visible in the bin.

After the rendering passes, in some examples, load/store (resolve/unresolve) operations are performed for the current frame of the scene.

As discussed above, in some examples that use 3D graphics, visibility stage 35 casts, for each pixel, a primary ray from the virtual camera through the pixel. In some examples, the distribution of the primary rays defines the virtual camera. In some examples, each pixel represents a location on the image plane. In these examples, each ray cast during visibility stage 35 is a primary ray. Primary rays (sometimes also called view rays) are rays that originate at the virtual camera's 3D position. The directions of primary rays are given by the view frustum of the virtual camera and by the resolution of the image plane. The virtual camera frustum is a volume in 3D space that defines which objects are considered relevant (everything outside the view frustum is irrelevant, because it won't end up being visible on the screen).

The act of defining the target/screen resolution, defines how the near/far clipping planes are subdivided into a regular grid of locations. Primary rays connect the virtual camera's 3D position with each location on the near/far clipping plane. A primary ray intersects the same relative location on both near and far clipping planes.

In some examples, one or more topological counters accumulate visibility statistics during the visibility pass simultaneous with the generation of the visibility stream. In some examples, one counter collects and updates the total number of primitives that hit a bin—this includes all primitives that intersect with the bin region, whether visible or not. In some examples, one counter collects and updates the total number of input primitives that are really visible in the bin. In some examples, for each bin, one counter collects and updates a running total of the total number of input primitives that hit the bin, and the total number of visible primitives that hit the bin. In some of these examples, the value of this counter may be used as a measure of scene complexity. In some examples, for each bin, one counter collects and updates the number of fully covered coarse pixels and total pixels in the bin.

In some examples, during the visibility pass, simultaneous with the generation of the visibility stream and the collection and updating of the visibility statistics with counters, GPU 12 generates various visibility heuristics based on the visibility statistic counters. In some examples, the visibility heuristics may include one, some, or all of: the overdraw ratio, the pixel update ratio, the scene complexity, a determination as to which regions have the more complex geometry with a high overdraw ratio, and/or the like.

As discussed above, in some examples, one visibility heuristic generated by GPU 12 may include the overdraw ratio. In some examples, the "overdraw" is an integer value per bin that represents the overlap between primitives rasterized in that region. "Overlap" may refer to the number of primitives greater than one that touch a pixel. The overdraw ratio may refer to the sum of the overlap scores for a bin divided by the total number of pixels in the bin (e.g., sum of overlap per pixel/number of pixels). In some examples, the overdraw ratio for a bin may be generated by calculating an overlap value for each pixel in a bin, summing each calculated overlap value for each pixel in the bin to produce a total overlap value, and dividing the total overlap value by a number of pixels in the bin to produce the overdraw number.

In some examples, the pixel update ratio is calculated as the number of pixels touched in the bin divided by the total number of pixels in the bin.

The scene geometry complexity may be calculated in different ways in different examples. In some examples, the scene complexity may be determined as the value of the counter that collects and updates a running total of: the total number of input primitives that hit the bin and the total number of visible primitives that hit the bin. In some examples, the scene complexity measures that amount of rendering work that must be done for the bin, or the amount of geometry that must be rendered for the bin. In some examples, the scene complexity is the number of primitives in the bin. In some examples, the complexity of the shader geometry may also be a factor in the scene complexity. In some examples, scene complexity is the number of primitives hitting the bin plus the shader complexity associated with rendering the primitives hitting the bin.

The visibility heuristics may be used for a variety of different purposes in various different examples. In some examples, the visibility heuristics may be used as an aid in determining the rendering mode to apply to a bin, where the decision as to which rendering mode to apply may be done on a bin-by-bin basis. For example, based on the visibility heuristics, a decision may be made on a bin-by-basis as to whether to render to graphics memory 14 (which requires a subsequent load/store operation) or to instead perform direct rendering, which uses slower system memory 10 rather that fast local graphics memory 14.

In some examples, the determination as to render to graphic memory 14 or to instead perform direct rendering may be based, in part, on which bins have both a complex geometry and a high overdraw ratio. The determination may be made in a dynamic manner. If the overdraw ratio is small, rendering to graphics memory is more desirable. If the pixel update ratio is low, direct rendering is more desirable. If the scene complexity is too high, direct rendering is less desirable. However, if the scene complexity is high, direct rendering is still preferable if most of the primitives are contributing to the pixel values. Rendering to graphics memory instead of direct rendering is desirable when portions of the bin that are not contributing can be eliminated.

Even if a scene is complex, if all primitives contribute, there is no value to rendering to graphics memory through binning because no rendering work will be eliminated by using visibility information generated at the binning pass—accordingly, direct rendering is desirable in this case in order to eliminate additional data transfer between fast graphics memory and the system memory used during binned rendering. Adjustable thresholds may be used for each bin, so for example, the other heuristics of the bin may be used to adjust the threshold scene complexity by which a bin will use direct rendering or rendering to graphics memory, and in some examples the visibility heuristics of other bins may be a factor used to dynamically adjust and/or update the threshold for a given bin.

In some examples, the visibility stream and the visibility heuristics all depend on the ray cast coordinates. Information about the binning configuration and which pixel contributes to which bin for the cast is known information that may be used to generate the visibility stream and the visibility heuristics.

In some examples, during the visibility pass, several visibility statistic counters accumulate visibility statistics. In some examples, the visibility statistic counters are topological counters that accumulate visibility statistics for the bin in real time simultaneous with the generation of the visibility stream during the binning pass.

GPU 12 may be configured to perform various actions based on a series of execution commands. The commands may include commands for, for example, the visibility pass and the rendering passes.

As discussed above, in some examples, during the visibility pass, GPU 12 uses ray tracing to generate a visibility stream, where the visibility stream includes visibility information for each bin. In some examples, a primary ray is cast through each pixel, and the visibility stream is generated by determining which triangles are visible in each bin based on ray intersection testing. The visibility stream indicates, for each bin, which primitives are actually visible in the bin, rather than indicating which primitives hit the bin. One example of ray tracing to perform the ray intersection tests is discussed in greater detail below with regard to FIGS. 5-7.

Figure 4:
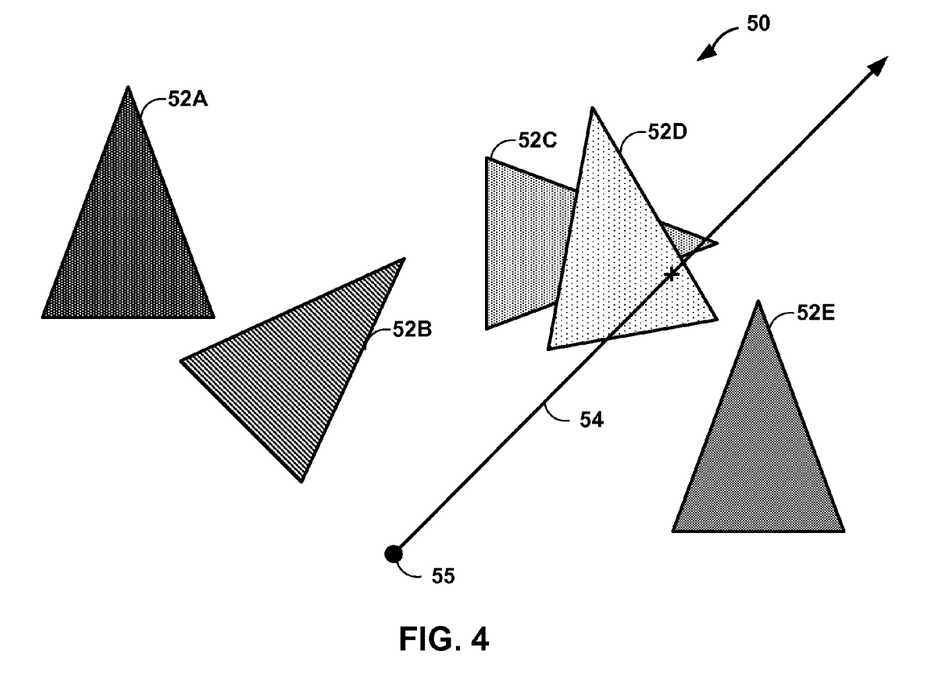
FIG. 4 is a conceptual diagram illustrating an example scene onto which a GPU may perform ray tracing.

FIG. 4 is a conceptual diagram illustrating an example scene onto which GPU 12 may perform ray tracing. As shown in FIG. 4, scene 50 may be a 2D or 3D scene that includes primitives 52A-52E (hereafter "primitives 52"). As part of the ray tracing process, GPU 12 may determine, for ray 54, which may be a 2D or 3D ray, and which emanates from source 55, the primitives in primitives 52 of scene 50 that are intersected by ray 54. As discussed above, in some examples, a primary ray may be cast through each pixel. FIG. 4 illustrates ray-intersection for one such ray, and in some examples, the same process is applied for each ray.

Ray tracing is a computer graphics technique used to determine ray-triangle intersections. Given an input ray and a set of triangles, the goal of the algorithm is to determine which triangles are intersected by the ray. Different types of intersection queries can be made: Nearest-hit (NH) intersection; Any-hit intersection; and/or All intersections. In order to accelerate the ray tracing operation, triangles (primitives) are typically organized into an acceleration data structure (ADS), such as a bounding volume hierarchy (BVH) tree, KD tree, grid, etc.

BVH is an unbalanced binary tree with two types of nodes. Interior nodes are nodes that represent a region of space described by axis-aligned bounding boxes (AABB) and have two children. Leaf nodes are nodes that also represent a region of space, but do not have any children. Instead, they reference a set of triangles contained in the bounding box.

In some examples, in order to trace a ray through a BVH tree, two types of operations are required: ray-box intersection tests, and ray-triangle intersection tests.

Figure 5:
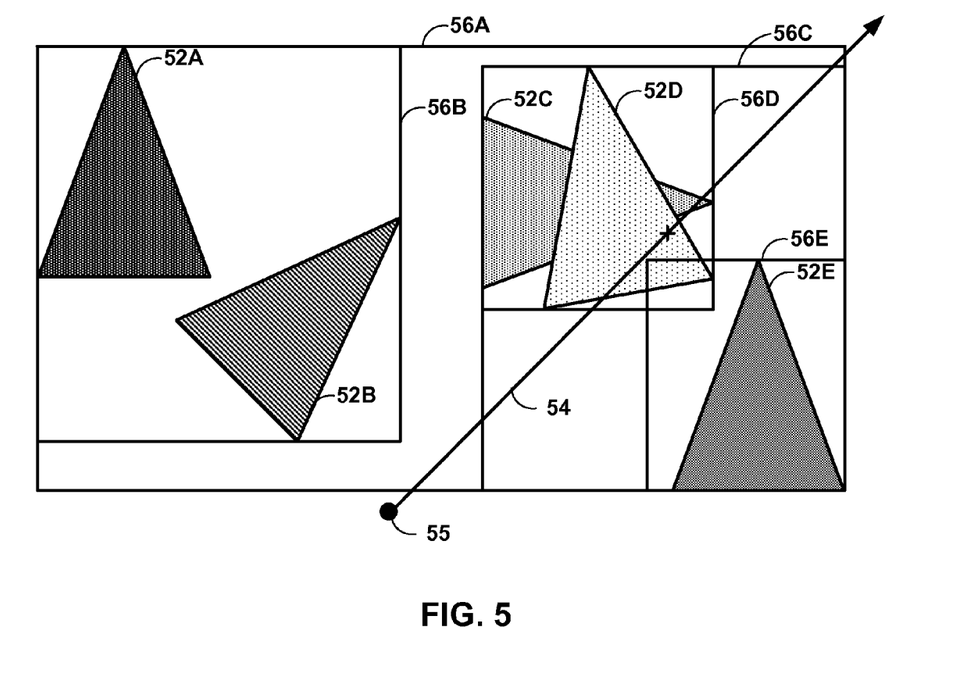
FIG. 5 is a conceptual diagram illustrating partitioning an example scene into bounding volumes.

GPU 12 may systematically determine the primitive in primitives 52 that is intersected by ray 54 by dividing scene 50, hierarchically arranging the divided portions of scene 50, and recursively traversing the hierarchy of the divided portions of scene 50. FIG. 5 is a conceptual diagram illustrating partitioning scene 50 into bounding volumes. As shown in FIG. 5, GPU 12 may conceptually partition primitives 52 into bounding volumes 56A-56E ("bounding volumes 56"). Bounding volumes 56 may be axis-aligned bounding boxes (AABBs), which may be bounding boxes having a minimized area within which all points of the enclosed primitives may lie. The bounding boxes may be axis-aligned such that the edges of the boxes may be parallel to the coordinate axis (e.g., the x, y, and z axis).

Bounding volume 56A may be a bounding box that bounds all primitives 52 of scene 50. Bounding volumes 56B and 56C may be subsets of bounding volume 56A in that bounding volumes 56B and 56C bound a subset of the portion of scene 50 bound by bounding volume 56A. Bounding volume 56B may bound primitives 52A and 52B, and bounding volume 56C may bound (i.e., spatially encompass) primitives 52C, 52D, and 52E. Bounding volumes 56D and 56E may be subsets of bounding volume 56C, and may bound a subset of the portion of scene 50 bound by bounding volume 56C. Bounding volume 56D may bound primitives 52C and 52D, and bounding volume 56E may bound primitive 52E.

In the example shown in FIG. 5, GPU 12 may partition primitives 52 into five bounding volumes 56. GPU 12 may use more than or fewer than five bounding volumes 56. For example GPU 12 may create additional bounding volumes as subsets of bounding volume 56B to individually bound primitives 52A and 52B, respectively. In some examples, CPU 6 may also be configured to partition primitives 52 into bounding volumes 56.

Figure 6:
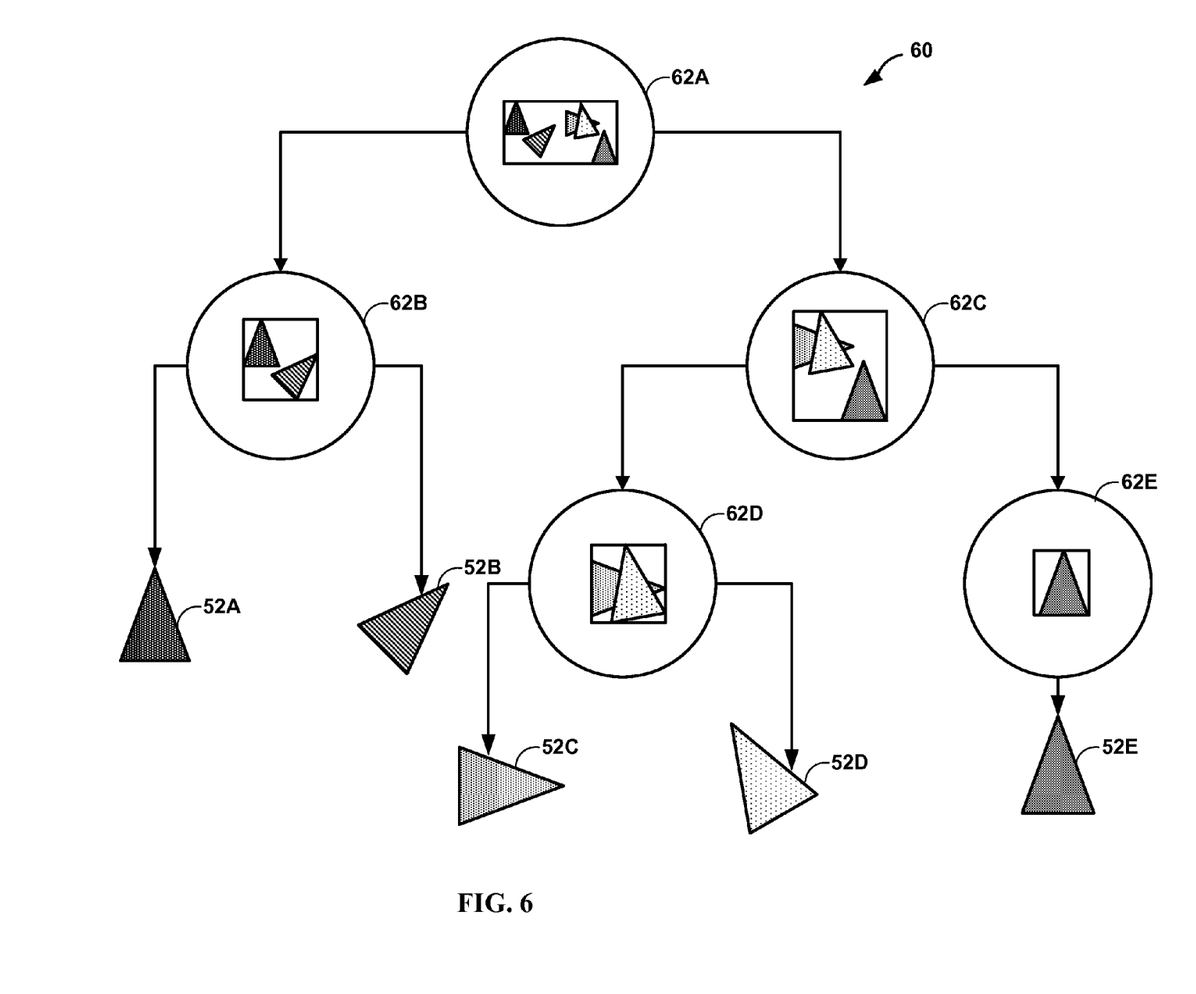
FIG. 6 is a conceptual diagram illustrating an example hierarchical data structure having nodes that are associated with the bounding volumes and the primitives shown in FIG. 5, in accordance with techniques of the disclosure.

FIG. 6 illustrates an example hierarchical data structure having nodes that are associated with the bounding volumes 56 and primitives 52 shown in FIG. 5. GPU 12 or CPU 6 may construct BVH tree 60 such that it may include nodes 62A-62E ("nodes 62") that are associated with bounding volumes 56 and primitives 52 in scene 50.

More specifically, root node 62A, interior node 62C, and leaf nodes 62B, 62D, and 62E may each be associated with a bounding volume of bounding volumes 56. Nodes of BVH tree 60 other than root node 62A may be referred to as non-root nodes of BVH tree 60. For example, interior node 62C and leaf nodes 62B, 62D, and 62E may be referred to as non-root nodes of BVH tree 60. Leaf nodes 62B, 62D, and 62E may each be linked with at least one primitive of primitives 52. For example, leaf node 62B may be linked with primitives 52A and 52B, leaf node 62D may be linked with primitives 52C and 52D, and leaf node 62E may be linked with primitive 52E. BVH tree 60 may be considered an unbalanced binary tree because each non-leaf node of hierarchical data structure 60 has at most two child nodes, and because leaf nodes 62B, 62D, and 62E may have unequal depths.

Because bounding volume 56A bounds all primitives 52 of scene 50, GPU 12 may associate root node 62A with bounding volume 56A. GPU 12 may associate nodes 62B and 62C, which are child nodes of root node 62A, with bounding volumes 56B and 56C, respectively, because bounding volumes 56B and 56C are each subsets of bounding volume 56A. GPU 12 may link primitives 52A and 52B with node 62B, because bounding volume 56B associated with node 62B bounds primitives 52A and 52B, and because there are no additional bounding volumes that are subsets of bounding volume 56B.

GPU 12 may associate bounding volumes 56D and 56E with nodes 62D and 62E, which are child nodes of node 62C, because bounding volumes 56D and 56E are each subsets of bounding volume 56C associated with node 62C. GPU 12 may link primitives 52C and 52D with node 62D, because bounding volume 56D associated with node 62D bounds primitives 52C and 52D, and because there are no additional bounding volumes that are subsets of bounding volume 56D. GPU 12 may also link primitive 52E with node 62E, because bounding volume 56E associated with node 62E bounds primitive 52E, and because there are no additional bounding volumes that are subsets of bounding volume 56E.

GPU 12 may traverse BVH tree 60 to determine the primitive of primitive 52 that intersects ray 54 by performing ray-box intersection tests for the bounding volumes 56 associated with nodes 62 of BVH tree 60. GPU 12 may start traversal of BVH tree 60 by performing a ray-box intersection test for bounding volume 56A associated with root node 62A. If GPU 12 determines that ray 54 intersects bounded volume 56A, GPU 12 may continue to traverse BVH tree 60 to node 62B, and GPU 12 may perform a ray-box intersection test for bounding volume 56B associated with node 62B. If GPU 12 determines that ray 54 does not intersect bounded volume 56B, GPU 12 may recursively traverse BVH tree up to node 62A and down to node 62C, and GPU 12 may perform a ray-box intersection test for bounding volume 56C associated with node 62C. If GPU 12 determines that ray 54 intersects bounded volume 56C, GPU 12 may continue to traverse BVH tree 60 to node 62D, and GPU 12 may perform a ray-box intersection test for bounding volume 56D associated with node 62D.

If GPU determines that ray 54 intersects bounded volume 56D, GPU 12 may perform a ray-primitive intersection tests for primitives linked to node 62D. Therefore, GPU 12 may perform a ray-primitive intersection test for primitive 52C and may also perform a ray-primitive intersection test for primitive 52D. GPU 12 may determine from the ray-primitive intersection test for primitive 52D that ray 54 does intersect primitive 52D. After GPU 12 determines that ray 54 does intersect primitive 52D, GPU 12 may continue to recursively traverse BVH tree 60 up to node 62C and down to 62E, and GPU 12 may perform a ray-box intersection test for bounding volume 56E associated with node 62E. GPU 12 may determine, based on the ray-box intersection test, that ray 54 does not intersect bounding volume 56E, thereby ending traversal of BVH tree 60 for ray 54.

As discussed above, in some examples, GPU 12 uses the results of the ray-intersection tests to generate the visibility stream for each bin.

In one or more examples, the functions described above may be implemented in hardware, software, firmware, or any combination thereof. If implemented in software, the functions may be stored as one or more instructions or code on an article of manufacture comprising a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Through the specification and the claims, the term "tangible computer-readable storage medium" is specifically defined herein to exclude propagating signals per se, but the term "tangible processor-readable storage medium" does include random access memory (RAM), register memory, processor cache, and the like.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Various examples have been described. These and other examples are within the scope of the following claims.

What is claimed is:

1. A method for graphics processing, comprising:
dividing a render target into a plurality of bins, wherein the render target includes a plurality of primitives and a plurality of pixels;
performing a visibility pass using ray tracing to generate a visibility stream, wherein using ray tracing to generate the visibility stream comprises:
casting a ray through each pixel of the render target;
performing ray intersection tests to determine, for each bin of the plurality of bins, which primitives are visible in the bin; and
based on the ray intersection tests, generating the visibility stream such that the visibility stream indicates, for each bin of the plurality of bins, which primitives are visible in the bin; and
for each bin of the plurality of bins, rendering, using rasterization, each primitive in the respective bin that is indicated in the visibility stream as being visible in the bin.

2. The method of claim 1, wherein each primitive of the plurality of primitives is a triangle.

3. The method of claim 1, wherein performing ray intersection tests to determine which primitives are visible in the bin includes ray-bounding-box intersection tests and ray-triangle intersection tests.

4. The method of claim 1, further comprising, while performing the visibility pass, generating a plurality of visibility heuristics.

5. The method of claim 4, wherein the visibility heuristics include, for each bin of the plurality of bins, at least one of: an overdraw ratio, a pixel update ratio, or a scene complexity.

6. The method of claim 1, further comprising, while generating the visibility stream, dynamically updating a plurality of visibility statistic counters.

7. The method of claim 6, wherein dynamically updating the plurality of visibility statistics counters is performed such that, for each bin of the plurality of bins, at least one counter of the plurality of visibility statistic counters dynamically accumulates at least one of: the total number of primitives that hit the bin, the total number of primitives actually visible in the bin, a sum of the total of the number of primitives that hit that bin and the number of primitives actually visible in the bin, or the number of fully covered coarse pixels and total pixels in the bin.

8. The method of claim 7, further comprising, simultaneous with generating the visibility stream, and also simultaneous with updating the plurality of visibility statistic counters, dynamically generating a plurality of visibility heuristics, wherein the visibility heuristics include, for each bin of the plurality of bins, at least one of: an overdraw ratio, a pixel update ratio, or a scene complexity.

9. A device for graphics processing, comprising:
a memory; and
at least one processing unit that is configured to:
divide a render target into a plurality of bins, wherein the render target includes a plurality of primitives and a plurality of pixels;
perform a visibility pass using ray tracing to generate a visibility stream, wherein generating the visibility stream comprises:
casting a ray through each pixel of the render target;

performing ray intersection tests to determine, for each bin of the plurality of bins, which primitives are visible in the bin; and based on the ray intersection tests, generating the visibility stream such that the visibility stream indicates, for each bin of the plurality of bins, which primitives are visible in the bin; and render, for each bin of the plurality of bins, using rasterization, each primitive in the respective bin that is indicated in the visibility stream as being visible in the bin.

10. The device of claim 9, wherein the at least one processing unit includes a graphics processing unit (GPU).

11. The device of claim 9, wherein the at least one processing unit is further configured such that each primitive of the plurality of primitives is a triangle.

12. The device of claim 9, wherein the at least one processing unit is configured to perform ray intersection tests to determine which primitives are visible in the bin by: performing ray-bounding-box intersection tests and performing a ray-triangle intersection tests.

13. The device of claim 9, the at least one processing unit is further configured to, while performing the visibility pass, generate a plurality of visibility heuristics.

14. The device of claim 13, wherein the at least one processing unit is further configured to generate the plurality of visibility heuristics such that the visibility heuristics include, for each bin of the plurality of bins, at least one of: an overdraw ratio, a pixel update ratio, or a scene complexity.

15. The device of claim 9, where the at least one processing unit is further configured to, while generating the visibility stream, dynamically update a plurality of visibility statistic counters.

16. The device of claim 15, wherein the at least one processing unit is further configured to dynamically update the plurality of visibility statistics counters such that the plurality of visibility statistic counters include, for each bin of the plurality of bins, a counter that dynamically accumulates at least one of: the total number of primitives that hit the bin, the total number of primitives actually visible in the bin, a sum of the total of the number of primitives that hit that bin and the number of primitives actually visible in the bin, or the number of fully covered coarse pixels and total pixels in the bin.

17. The device of claim 16, where the at least one processing unit is further configured to, simultaneous with generating the visibility stream, and also simultaneous with updating the plurality of visibility statistic counters, dynamically generate a plurality of visibility heuristics, wherein the visibility heuristics include, for each bin of the plurality of bins, at least one of: an overdraw ratio, a pixel update ratio, or a scene complexity.

18. A tangible computer-readable storage medium storing instructions for graphics processing that, when executed, cause one or more processors to:

divide a render target into a plurality of bins, wherein the render target includes a plurality of primitives and a plurality of pixels;

perform a visibility pass using ray tracing to generate a visibility stream, wherein using ray tracing to generate the visibility stream comprises:

casting a ray through each pixel of the render target;

performing ray intersection tests to determine, for each bin of the plurality of bins, which primitives are visible in the bin; and based on the ray intersection tests, generating the visibility stream such that the visibility stream indicates, for each bin of the plurality of bins, which primitives are visible in the bin; and for each bin of the plurality of bins, render, using rasterization, each primitive in the respective bin that is indicated in the visibility stream as being visible in the bin.

19. A device for graphics processing, comprising:

means for dividing a render target into a plurality of bins;

means for performing a visibility pass using ray tracing to generate a visibility stream, wherein using ray tracing to generate the visibility stream comprises:

casting a ray through each pixel of the render target;

performing ray intersection tests to determine, for each bin of the plurality of bins, which primitives are visible in the bin; and based on the ray intersection tests, generating the visibility stream such that the visibility stream indicates, for each bin of the plurality of bins, which primitives are visible in the bin; and means for rendering, using rasterization, for each bin of the plurality of bins, each primitive in the respective bin that is indicated in the visibility stream as being visible in the bin.

20. The device of claim 19, wherein each primitive of the plurality of primitives is a triangle.

21. The device of claim 19, further comprising means for dynamically updating a plurality of visibility statistic counters while generating the visibility stream.

22. The device of claim 19, further comprising means for generating a plurality of visibility heuristics while performing the visibility pass.

23. The device of claim 22, wherein the visibility heuristics include, for each bin of the plurality of bins, at least one of: an overdraw ratio, a pixel update ratio, or a scene complexity.

* * * * *